United States Patent Office 3,509,164
Patented Apr. 28, 1970

3,509,164
DERIVATIVES OF 1-(p-HYDROXYPHENYL)-2-(4-BENZYL-1-PIPERIDINO)-(ALKANOLS)
Maurice Claude Ernest Carron and Claude Louis Clement Carron, Chatenay-Malabry, and Bernard Philippe Bucher, Palaiseau, France, assignors to Societe Anonyme des Laboratoires Robert et Carriere, Paris, France, a French body corporate
No Drawing. Filed Sept. 21, 1967, Ser. No. 669,413
Claims priority, application France, Sept. 27, 1966, 77,770
Int. Cl. C07d 29/16
U.S. Cl. 260—294.7    4 Claims

ABSTRACT OF THE DISCLOSURE

Piperidinoalkanols of the formula:

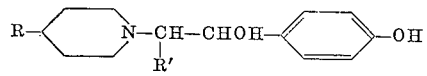

and their salts, where R is alkyl or aralkyl and R' is alkyl, are useful as vasodilators, cardiotonics, and hypotensors.

---

This invention relates to therapeutically useful piperidinoalkanols.

The present invention provides, as new compounds, the piperidinoalkanols of the formulae:

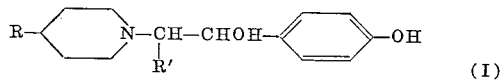

in which R represents alkyl, preferably 1 to 4 carbon atoms, more particularly methyl or ethyl, or aralkyl, more particularly benzyl, and R', alkyl preferably of 1 to 4 carbon atoms, more particularly methyl, and their pharmaceutically acceptable acid addition salts, such as hydrochloric acid, ascorbic acid, maleic acid, and succinic acid, and especially the alcoholic acids (e.g. tartaric acid, citric acid, lactic acid, and hydroxymaleic acid).

The invention also provides a process for the preparation of the piperidinoalkanols of Formula I which comprises reducing a ketone of formula:

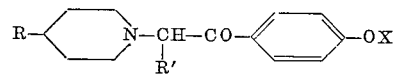

where R and R' are as hereinbefore defined and X represents a radical replaceable by hydrogen, under conditions such as to convert the —CO— group to —CHOH—, simultaneously and subsequently replacing the radical X by hydrogen, and optionally converting a base obtained into a pharmaceutically acceptable acid addition salt thereof.

The ketones of Formula II may be made by the interaction of a compound of the formula:

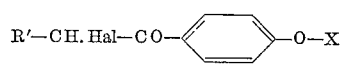

where Hal denotes halogen, more particularly bromine, and R' and X are as hereinbefore defined, with a compound of the formula:

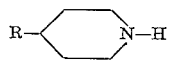

where R is as hereinbefore defined.

The radical X is preferably benzyl, in which case the reduction and simultaneous replacement of X by hydrogen can be effected by catalytic hydrogenation, e.g. the presence of palladized charcoal.

The following examples illustrate the invention.

EXAMPLE 1

1-(p-hydroxyphenyl)-2-(4-methyl-piperidino)propan-1-ol p-Benzyloxypropiophenone is synthesized by benzylation of p-hydroxypropiophenone by the method of Sutter et al. (J. Amer. Chem. Soc. 66, 747 (1944)). This compound is then brominated in the α-position to produce p-benzyloxy-α-bromopropiophenone by the process of Moed et al. (Rec. Trav. Chim. 75, 1215–20 (1956)).

20 g. of γ-pipecoline (0.204 mol.), 32 g. of the said brominated ketone (0.1 mol.) and 130 ml. of absolute ethanol are then introduced into a round-bottomed, 500-ml. flask provided with a reflux condenser and a soda lime tube. The mixture is refluxed, for 3 hours, the alcohol is then evaporated under reduced pressure, and the residue extracted twice with 50 ml. of diethyl ether each time. The precipitated pipecoline hydrobromide is separated, and the ethereal filtrate is evaporated to a small volume. Crystals are obtained on cooling which are washed in luke-warm water (60° C.), separated, and dried in vacuo. 29 g. (87% yield) of 1-(p-benzyloxyphenyl)-2-(4-methyl-piperidino)-propan-1-one, M.P. 52–54° C., are obtained.

16.85 g. of this ketone are dissolved in 55 ml. of ethyl acetate and hydrogenated at 70° C. under a pressure of 50 kg./cm.² in the presence of 2 g. of catalyst (palladium on charcoal). The reaction lasts about 10 hours. After filtration of the catalyst and evaporation of the solvent, 13 g. of 1-(p-hydroxyphenyl)-2-(4-methyl-piperidino)propan-1-ol are obtained, which, after recrystallisation from 75% aqueous ethanol, melts at 140–145° C.

Its hydrochloride melts at about 265° C.

Analysis.—Cl: Calculated—12.45%, found—12.25%.
Its solubility in water is 0.48% at 20° C.

The neutral tartrate melts at 200–202° C.

Analysis.—Base: Calculated—62.96%, found—62.4%.
Its solubility in water is 8% at 20° C., the pH of the solution being 6.6.

The hydrochloride was prepared by dissolution of the base in absolute ethanol and addition of concentrated hydrochloric acid.

The salt precipitates, and the precipitation can be increased by the addition of diethyl ether. The neutral tartrate was prepared in ethanolic medium under similar conditions.

The neutral tartrate can also be prepared directly by reducing 1-(p-benzyloxyphenyl)-2-(4 - methylpiperidino)propan-1-one in aqueous alcoholic medium in the presence of the theoretical quantity of tartaric acid. The reduction is then rapid. For carrying out this reaction, a mixture of 22.4 g. of the ketone (0.0666 mol.) and 5 g. of tartaric acid (0.0333 mol.) is hydrogenated in 81 ml. of ethanol and 81 ml. of water, in the presence of palladium on charcoal at 50° C. and under a pressure of 30 kg./cm.². The theoretical quantity of hydrogen is absorbed. After filtration of the catalyst at elevated temperature and evaporation of the solvent, the residue is recrystallised from aqueous ethanol. The yield is 80%.

EXAMPLES 2–5

In a similar manner to that described in Example 1, the following compounds are prepared:

(a) 1-(p - hydroxyphenyl)-2-(4 - ethylpiperidino)propan-1-ol: This compound starts to decompose at 70° C. Its hydrochloride melts at 230–5° C.

Analysis.—Cl: Calculated—11.83%, found—11.80%.
Its solubility in water is 1.56% at 20° C.

(b) 1-(p-hydroxyphenyl)-2-(4 - benzylpiperidino)propan-1-ol, M.P. 110° C.: Its hydrochloride has M.P.=238–40° C.

*Analysis.*—Cl: Calculated—9.80%, found—9.80%. Its solubility in water is 0.46% at 20° C.

Its acid tartrate is a pasty compound, which has a solubility in water of 6% at 20° C.

Its ascorbate is a pasty compound which has a solubility in water of about 8%.

Its lactate is a pasty compound which has a solubility in water of 1.4%, the pH of the solution being 7.

Its acid citrate is crystalline and has a solubility in water of 1.4%.

Its acid succinate is crystalline and has a solubility in water of 1.0%.

Its acid maleate is crystalline and has a solubility in water of 1.1%.

The hydrochlorides are prepared as in Example 1. All the other salts are prepared in aqueous medium by simple mixing of the base and the acid in appropriate proportions and evaporation of the solution.

The neutral tartrate may be prepared directly by reduction of 1-(p-benzyloxyphenyl)-2-(4-benzyl - piperidino) propan-1-one, obtained in a manner similar to the corresponding compound of Example 1. For the reduction, a mixture of 175 g. of ketone (0.425 mol.) and 32 g. of tartaric acid (0.213 mol.) is hydrogenated at 50° C. under a pressure 50 kg./cm.$^2$ in 440 ml. of methanol in the presence of 12 g. of palladium on charcoal. The catalyst is filtered off at elevated temperature, and the filtrate is concentrated by evaporation under reduced pressure to a volume of 300 ml. and added in a thin stream to 2.5 l. of diethyl ether with mechanical agitation. The precipitate is separated, washed with diethyl ether and dried in vacuo at 80–85° C. for several hours. 325 g. (96% yield) of the neutral tartrate of 1-(p-hydroxyphenyl)-2-(4-benzyl-piperidino)propan-1-ol are obtained.

(c) 1-(p-hydroxyphenyl)-2-(4 - benzylpiperidino) - n-butan-1-ol, M.P. 71° C.: Its hydrochloride has M.P. 215–220° C.

(d) 1-(p-hydroxyphenyl)-2-(4 - benzylpiperidino) - n-pentan-1-ol, M.P. 70–72° C.: Its hydrochloride is crystalline.

Pharmacological tests of the new compounds revealed the following results.

ACUTE TOXICITY

The tests were applied to male mice of Swiss strain, each weighing between 18 and 20 g. The 50% lethal doses were calculated by the method of Miller and Tainter (Proc. Soc. Exptl. Biol. Med. 1944, 56, 261). The following results were found:

1-(p-hydroxyphenyl)-2-(4-benzylpiperidino)propan-1-ol ascorboate (Compound I)

$LD_{50}$: Mg./kg.
Intraperitoneal route _____ about 150
Oral route _____ about 625

Neutral tartrate of 1-(p-hydroxyphenyl)-2-(4-benzyl-piperidino)propan-1-ol (Compound II)

$LD_{50}$: Mg./kg.
Intravenous route _____ 17±2
Intraperitoneal route _____ 120±6.5
Oral route _____ 275±17

1-(p-hydroxyphenyl)-2-(4-methylpiperidino)propan-1-ol tartrate (Compound III)

$LD_{50}$: Mg./kg.
Intraperitoneal route _____ about 125

1-(p-hydroxyphenyl)-2-(4-ethylpiperidino)propan-1-ol hydrochloride (Compound IV)

$LD_{50}$: Mg./kg.
Intraperitoneal route _____ about 45
Oral route _____ about 300

SUBCHRONIC TOXICITY (1) *In the rat.*—Over a period of 6 weeks (5 days per week), male and female rats of Charles River D strain (each initially weight between 120 and 185 g.) received by the oral route 20, 40 or 60 mg./kg. of Compound II per day. This treatment brought about no significant modification in behaviour as compared with the control animals, no change of weight curve, nor any change in the results of haematological tests (red blood corpuscles, total leucocytes, leucocytal formula, haemoglobin concentration). Autopsy on the rats showed no modification of weight of, and no change in, the organs observed (liver, kidneys, spleen, heart, adrenal glands, testicles or ovaries) as compared with that was found in the controls.

(2) *In the rabbit.*—Male and female rabbits of Fauve de Bourgogne strain, each initially weighing from 1535 to 2195 g., received by the oral route 40 mg./kg. of Compound II per day over a period of 9 weeks (5 days per week). At the end of the experiment, no significant modification of the growth curves or of the haematology (erythrocytes, leucocytes, leucocytal formulae, concentration of haemoglobin) was observed. After autopsy, the weight and histological examination of the organs (liver, kidneys, heart, spleen, adrenal glands, the gonads, the thyroid gland, the stomach, the duodenum and the caecum) showed no significant difference between the treated animals and the controls.

EFFECTS ON THE CARDIO-VASCULAR SYSTEM (1) *Action on arterial blood pressure.*—The effect of the new compounds on arterial blood pressure was investigated in anaesthetised animals of various species (rats, rabbits, dogs). After exposure of the carotid, a cannula was introduced and the pressure was recorded by means of a Condon manometer (Brit. J. Pharmacol. 1951, 6, 19) in the rabbit and the rat. In the dog, the pressure was noted either in the same way or with the aid of a mercury manometer of the Ludwig type, or a Schwarzer pressure cell Z 15/65, with recording on the Schwarzer Physioscript EE 12. In the latter case, it was possible to note at the same time the electrocardiogram, the heart rate, the intra-auricular pressure (by means of a catheter introduced through the right outside jugular vein as far as the right auricle and placed in communication with a Schwarzer low-pressure cell (PM6+-I-350), the respiratory movements by means of the Fleish pneumotachograph, type Z 132/69, and the respiratory volume.

The action of the medicaments was studied on the initial blood pressure and the response to various stimulations (adrenaline, noradrenaline, isoprenaline, acetylcholine and propanolol, in particular, and also occlusion of the carotids or stimulation of the pneumogastric nerve). The following results were obtained:

Compound I (a) Intravenous route: By the intravenous route (femoral artery), there was observed in the rat a rapid deep hypotension (−66%) which was prolonged (at least 90 minutes) with doses of 500 μg./kg. or 2 mg./kg. In this animal, phentolamine, used for comparison, also produced a sudden deep hypotension (−57% in a dose of 250 μg./kg., intravenous), but less prolonged. The adrenolytic effect by the intravenous route was distinct at doses of 500 μg./kg. or more.

In the rabbit, doses of 250 μg. to 2 mg./kg. by the intravenous route produced lasting hypotension ranging from −40% to −63%. Yohimbine (2 mg./kg.) produced an equally deep, but less lasting hypotension. The adrenolytic effect is also more pronounced than that of yohimbine.

In the dog, hypotension was especially marked at doses of 1 mg./kg. (intravenous) or more. There then existed a tendency to tachycardia and respiratory analepsis.

(b) Oral route: In the rat, in a dose of 20 mg./kg., the compound produced at the end of 15 minutes a hypotension of —38% which gradually increased (—50% at the end of 60, 90 and 120 minutes). In a dosage of 25 mg./kg., the hypotension was also slowly established, reaching —60% at the end of 2 hours.

In the dog, a distinct reversal of the effects of 5 $\mu$g. of adrenaline (—50%) was observed with a dose of 3 mg./kg. (intravenous route) of Compound I. With this dose, the hypotension is cancelled out and is reversed at the end of 5 minutes and only an injection of acetylcholine could produce the return of the pressure to normal. When administered intravenously, Compound II produced in the dog a slight, short reduction of the arterial pressure starting at a dose of 200 $\mu$g./kg. At higher doses, this effect is very marked. At 5 mg./kg. (intravenous), for example, the diastolic pressure decreases by —80%, the systolic pressure being much less modified. From 100 $\mu$g./kg. (intravenous), a very distinct increase in the right auricular systolic pressure, and tachycardia are observed. The respiratory movements are only slightly accelerated without modification of the rhythm, with a dose of 3 mg./kg. (intravenous). The compound is also adrenolytic. The adrenalin hypotension was reversed by administration of 3 mg./kg. (intravenous). The carotid reflex was eliminated after administration of 5 mg./kg. of Compound II intravenous. The effect of the excitation of the vagus nerve is less modified. When administered by the gastric route, in a dose of 35 mg./kg., this compound produced a rapid, deep and very lasting lowering of the arterial pressure (—53% at the end of 10 minutes, —60% at the end of 20, 30 and 60 minutes, and —65% at the end of 120 minutes). With the same dose, the carotid reflex was eliminated and the adrenalin hypertension reversed.

It is also to be noted that isoprenalin hypotension is not modified by Compound II, that the nor-adrenalin hypertension is reduced, and that the hypotension produced by Compound II is not modified by an adrenegic blocking agent of the Beta type (e.g. propanolol). Compound II therefore exerts an adrenolytic effect of the alpha-lytic type.

In the rat, 500 $\mu$g./kg. (intravenous route) of Compound III produced a sudden hypotension (—30%), with rapid return to normal. 2 mg./kg. of atropine removed this effect. The effect of 10 $\mu$g./kg. of adrenaline of 3 $\mu$g./kg. of acetylcholine (intravenous route) was not modified.

In the rat, a dose of 75 $\mu$g./kg. of Compound IV by the intravenous route gave a hypotension of short duration. In doses of 125 and 150 $\mu$g./kg., the hypotension was greater without rapid return to normal. Atropine did not modify this effect.

In the dog, the hypotension was gradual, moderate and lasting (—20%) in doses of 1 mg./kg. and 5 mg./kg. (intravenous route). The adrenolytic effect in this animal was appreciable with these two doses. For example, with 5 mg./kg. the hypertensive effect of 5 $\mu$g. of adrenaline was eliminated, with production of a medium and prolonged hypotension. The effect of acetylcholine, on the other hand, was a little enhanced. The product is therefore adrenolytic and slightly gangliopelgic.

(2) *Action on the peripheral vessels.*—The peripheral vasodilatory effect was studied on the dog's paw perfused in situ by the method of Binet et al., C. R. Acad. Sciences (1945), 221,197. This method makes it possible, by simultaneously recording the general carotid tension and the tension upstream of a femoral artery removed from the general circulation by the adnexal heart system (Jouvelet pump), to dissociate the peripheral vasomotor effects of the medicaments directly injected into the perfused vessels, from the vasomotor effects of central or cardiac origin. A vasodilation of strictly peripheral origin then results in a reduction of blood pressure only in the perfused vessels. In these experiments, the reference product was isoxsuprine or 1-(p-hydroxyphenyl)-2-(1-methyl-2-phenoxyethylamino)propan-1-ol. The following results were obtained:

A dose of 15 $\mu$g. of Compound I had the same action as 5 $\mu$g. of isoxsuprine. This is the optimum quantity. No enhancement of the action was obtained by increasing the dosage.

When injected intraarterially (1 $\mu$g.), Compound II exerted a powerful peripheral vasodilatory action which was 5 times as great as that of the reference product.

A dose of 250 $\mu$g. of Compound III had the same action as 5 $\mu$g. of isoxsuprine.

The effect of Compound III was the same type as that of Compound I, but weaker.

(3) *Action on the isolated heart (effect on the coronary vessels and cardiotonic effects.*—The test was made on isolated rabbits' hearts suspended and perfused in accordance with the technique of Langendorff (Arch. Ges. Physiol. (1895), 61,291), the contractions and coronary flow of which were recorded by Professor Fleisch's totaliser (made by B. Braun, Melsungen, West Germany).

Compound I dilated the coronary vessels but had no cardiotonic effect.

Compound III paradoxically produced a vasoconstrictive action on the coronary vessels (strong at 500 $\mu$g.), but was a good cardiotonic.

Compound IV had a weak cardiotonic action in a dose of 200 $\mu$g. It also produced dilation of the coronary vessels.

(4) *Action on the arterial flow in situ.*—All the tests were carried out on adult mongrel dogs of both sexes, of a weight of 12 to 21 kg., which were anaesthetised (chloralose or chloroaloseurethane). The flows were measured by means of periarterial "Flow-Probe" detectors disposed around the intact vessels and connected to a Statham Multiflometer, which was in turn connected to the Schwarzer Physioscript.

(a) Carotid flow: Compound I, in a dose of 1 mg./kg. administered intravenously, reduced the carotid flow in a rapid and prolonged manner.

(b) Cerebral flow: Compound II, in a dose of 1 mg./kg. administered intravenously, increased the cerebral flow by about 30%, despite the distinct and prolonged collapse of the general arterial pressure, taken from the carotid.

(c) Femoral flow: 500 $\mu$g./kg., intravenous, of Compound II exerted a sudden and prolonged femoral vasodilation.

(d) Coronary flow: Compound I, from the dose of 500 $\gamma$/kg. (intravenous), exerted a particularly intense vasodilatory effect which was greater than that of khellin.

(e) Renal volume: When intravenously administered, Compound I exerted a biphasal action on the renal volume. There was first a reduction caused by the onset of hypotension and to the temporary reduction of the blood mass resulting therefrom.

A particularly prolonged vasodilatory phase was then observed, the maximum intensity of which occurred 40 minutes after the intravenous injection and the duration of which approached 90 minutes.

Compounds I and II, which are salts of the same base, thus possess an intense peripheral vasodilatory action.

(5) *Antiarrhythmic activity.*—When intravenously administered in a dose of 8 mg./kg. ($\frac{1}{2}$ LD$_{50}$), Compound II possesses a very distinct protective activity against electrocardiographic disorders produced by aconitine (7.5 $\mu$g., administered intravenously) in the rat. This activity is very slightly less than that exerted by a corresponding pharmacological dose of procaine amide (50 mg./kg., intravenous=$\frac{1}{2}$ LD$_{50}$).

(6) *Adrenolytic activity in vitro.*—This activity was tested on the isolated seminal vesicle of the rat by the technique of Leitch et al. (Brit. J. Pharmocal. 1954, 9, 236. Compound II exerted a distinct adrenolytic effect in a dose of 0.5 μg./ml. (about $ED_{60}$). This effect is at least twice as great as that exhibited by isoxsuprine.

(7) *Various effects.*—Compound II provide slightly sedative in doses of 25 and 50 mg./kg. by the oral route. It exerts an analgestic effect, but in doses which are too close to the toxic doses to be used in therapeutics in this field. Finally, it possesses an extremely slight miotic effect.

General table of the effects obtained, given by way of example,

| Compound | Hypotensive effect | Adrenolytic effect | Peripheral vasodilatory effect | Coronodilatory effect | Coronostrictive effect | Cardiotonic effect | Antiarrhythmic activity |
|---|---|---|---|---|---|---|---|
| I | ++ | ++ | ++ | + | | | |
| II | ++ | ++ | +++ | ++ | | | ++ |
| III | + | | + | | + | ++ | |
| IV | + | ++ | + | + | | + | |

The results of these pharmacological tests make it possible to use the new compounds therapeutically in human medicine, more especially as vasodilators for the superficial and deep vessels, as cardiotonics and as hypotensors. Thus, they may find application in arterities, Raynaud's syndrome, cerebral sclerosis, atherosclerosis and, at the peripheral level, in the treatment of acrocyanosis and chilblains.

The invention accordingly includes within its scope pharmaceutical compositions comprising one or more of the compounds of Formula I a pharmaceutically acceptable salt thereof, in association with a pharmaceutical carrier.

Administration may be by the oral or parenteral route, the optimum daily dose being from 2 to 50 mg. per day by theoral route and from 2 to 20 mg. per day by the intramuscular, intraarterial or intravenous route.

Examples of pharmaceutical forms are given in the following, in these examples, the dose of compound represents the weight of the base.

EXAMPLE 1

Compound I _____ mg__ 10
Usual excipient (lactose, magnesium stearate, silica gel, starch, etc.), q.s. for 1 tablet.

The dose of active substance may vary from 2 to 20 mg. per tablet. The tablets may be given a plain or sugar coating.

EXAMPLE 2

Compound II _____ mg__ 10
Physiological saline _____ ml__ 2
The dose of active substance may range from 2 to 20 mg. per ampoule.

Similar preparations may be made with all the compounds of the invention.

We claim:
1. A member selected from the group consisting of a piperidino-alkanol of the formula

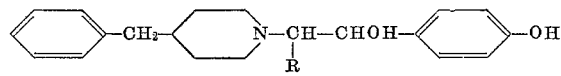

and its pharmaceutically acceptable acid addition salts, where R is alkyl of 1 to 4 carbon atoms.

2. A member selected from the group consisting of a piperidino-alkanol as claimed in claim 1 being 1-(p-hydroxyphenyl)-2-(4-benzyl-1-piperidino) - propan - 1 - ol and its pharmaceutically acceptable acid addition salts.

3. A member selected from the group consisting of a piperidino-alkanol as claimed in claim 1 being 1-(p-hydroxyphenyl)-2-(4-benzyl - 1 - piperidino)-n-butan-1-ol and its pharmaceutically acceptable acid addition salts.

4. A member selected from the group consisting of a piperidino-alkanol as claimed in claim 1 being 1-(p-hydroxyphenyl-2-(4-benzyl - 1 - piperidino)-n-pentan-1-ol and its pharmaceutically acceptable acid addition salts.

References Cited

UNITED STATES PATENTS 1,915,334  6/1933  Salzberg et al. _____ 260—243
2,075,359  3/1937  Salzberg et al. _____ 167—22

OTHER REFERENCES

Chemical Abstracts, vol. 55, p. 21138d, October 1961, Chiti et al.

HENRY R. JILES, Primary Examiner

S. D. WINTERS, Assistant Examiner

U.S. Cl. X.R.

260—294, 592; 424—267